Oct. 1, 1935.    C. W. LA PIERRE ET AL    2,016,147
ELECTRIC VALVE TRIPPING CIRCUIT
Filed July 21, 1934
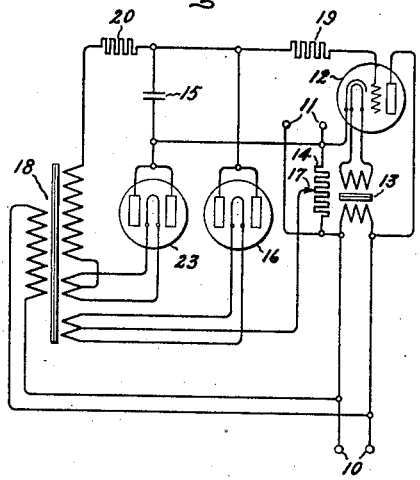
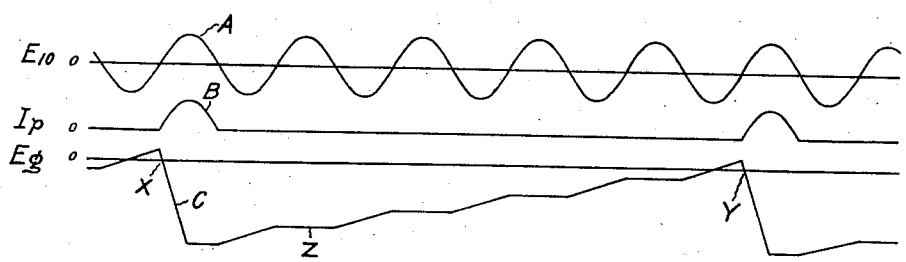
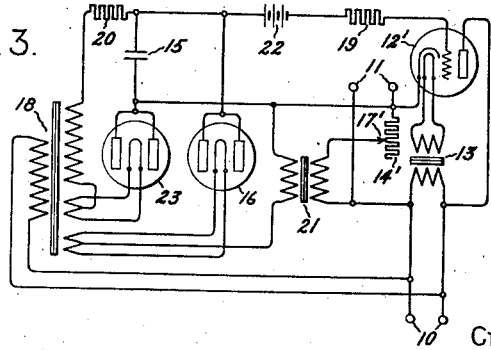
Inventors:
Cramer W. LaPierre,
Milton S. Mead,
Francis B. Menger,
by Harry E. Dunham
Their Attorney Patented Oct. 1, 1935

2,016,147

UNITED STATES PATENT OFFICE 2,016,147

ELECTRIC VALVE TRIPPING CIRCUIT

Cramer W. La Pierre, Milton S. Mead, and Francis B. Menger, Schenectady, N. Y., assignors to General Electric Company, a corporation of New York Application July 21, 1934, Serial No. 736,384

9 Claims. (Cl. 172—281)

Our invention relates to periodic current generating systems and more particularly to such circuits utilizing an electric valve for producing current impulses at predetermined time intervals.

Heretofore numerous arrangements have been devised for generating periodic current by means of electric circuits including electric valves. Certain of these arrangements utilizing electric valves have had the disadvantages of unsatisfactory operation of undesirable wide variations in the frequency of the periodic current output, or that only relative low power output could be obtained. For certain applications of such periodic current generating systems it is desirable that the generator supply current or voltage impulses of a predetermined duration at a frequency or time interval which may be varied over wide limits.

It is an object of our invention to provide an improved electric circuit including electric valves which will overcome the above mentioned disadvantages of the arrangements of the prior art and which will be simple and reliable in operation over wide limits of frequency variation.

Another object of our invention is to provide an improved method of operation of an electric circuit including electric valves.

It is a further object of our invention to provide an improved electric circuit including electric valves for generating a periodic current which will operate satisfactorily over wide limits of frequency variation, and which will produce uniform impulses throughout the limits of frequency variation.

It is a still further object of our invention to provide an improved electric circuit including electric valves operating from an alternating current source so as to produce a single half wave current impulse at predetermined time intervals.

In accordance with one embodiment of our invention we provide an electric energy storage means, such as a capacitor, arranged to be charged from a unilaterally conductive circuit to a predetermined potential. This predetermined potential existing across the charged capacitor is impressed upon the grid or control circuit of an electric valve which is so arranged, or has such a characteristic, as to remain substantially nonconductive until the potential charge across the capacitor is reduced to a predetermined value. In order to reduce this charge across the energy storage means to a predetermined value we provide a second circuit which is connected to the capacitor and which has a high impedance characteristic and supplies periodic unidirectional current impulses so as to reduce the potential charge of the capacitor by periodic increments to a point where the potential charge of the capacitor is reduced to the predetermined value so that the electric valve again becomes conductive. In the output circuit of the electric valve means are provided having a substantial impedance for generating a potential in accordance with the current flowing in the output circuit thereof and a portion of the potential thus developed is selectively supplied to the unilaterally conductive charging circuit of the energy storage means.

For a better understanding of our invention together with other and further objects thereof, reference may be had to the following description taken in connection with the accompanying drawing, in which Fig. 1 shows a preferred embodiment of our invention, Fig. 2 illustrates graphically the operating characteristics thereof and Fig. 3 shows a modification of our invention. The novel features which we believe to be characteristic of our invention are set forth with particularity in the appended claims.

Referring now to Fig. 1 of the drawing, there is illustrated an arrangement for receiving energy from a source of pulsating current connected to the terminal 10 and converting it into periodic current or voltage impulses appearing across the load terminals 11. This apparatus comprises an electric valve 12 having an anode, a control element and a cathode which, as illustrated, may be of the indirectly heated type. This valve has the characteristic that it is substantially nonconductive as long as a certain potential is present between the control element and cathode thereof. Thus, as is well-known by those skilled in the art, this valve may comprise a valve of a high vacuum type which is biased to substantially anode current cutoff, or a valve of the discontinuous control type which preferably is of the vapor electric discharge type, as illustrated in the drawing. The anode is energized from the source of pulsating potential appearing across the terminal 10 and the cathode is also energized from this source through the medium of a suitable transformer 13. The anode to cathode circuit includes an impedance device or resistor 14 which is for the purpose of generating a voltage across this impedance whenever current flows in the anode to cathode circuit.

An energy storage device, illustrated as a capacitor 15, is arranged to be charged from a circuit extending from one terminal of the impedance device 14 to the capacitor 15 through a unilaterally conducting device 16 back to an adjustable contact 17 of the impedance device 14. The unilaterally conductive device 16 may comprise an electric valve rectifier having its cathode energized from the source 10 by means of a transformer 18. This unilaterally conductive charging circuit therefore operates to charge the capacitor 15 to a potential substantially equal to that portion of the potential appearing across the impedance device 14 between the upper terminal thereof and the adjustable contact 17. The capacitor 15 also forms an element in the cathode to grid circuit of the valve 12 which extends from the upper terminal of the impedance device 14 through the capacitor 15 to the grid by means of a current limiting resistor 19. It will be assumed that the potential now appearing across the capacitor 15 is sufficient to maintain the electric valve 12 substantially nonconductive.

In order to reduce the potential charge existing across the capacitor 15 to a value at which the electric valve 12 will become conductive, this charge is reduced by periodic increments by applying to the capacitor periodic unidirectional impulses from a high impedance circuit. As will be apparent to those skilled in the art, such a high impedance periodic unidirectional impulse generating circuit may be of any one of a number of forms. A satisfactory arrangement, as illustrated, comprises an electric valve rectifier, a source of pulsating current obtained from the secondary winding of the transformer 18, and a high impedance device 20 which may be in the form of a resistor as shown. This periodic unidirectional impulse generating circuit is given a high impedance characteristic by the impedance device 20 so as to prevent the capacitor 15 from discharging through the circuit during the time when the rectifier 23 is conductive.

For a better understanding of the operation of the embodiment illustrated in Fig. 1 reference may be had to Fig. 2. The curve A in Fig. 2 illustrates the alternating potential $E_{10}$ supplied by the source connected to the terminal 10; the curve B shows the current $I_p$ flowing in the anode circuit of the electric valve 12 and the curve C represents the voltage $E_g$ appearing across the capacitor 15. It will be assumed that the capacitor 15 is initially completely discharged so that the grid or control element of the electric valve 12 is at proper potential and that the valve is energized from the source of current appearing across the terminals 10. Since the grid and cathode of the valve 12 are at the same potential, the valve 12 is conductive and the current in the anode circuit flows for a half a cycle through the load 11 and the impedance device 14. The flow of current in the anode circuit of the valve 12 produces a voltage across the impedance device 14, a portion of which is common to the capacitor charging circuit comprising the adjustable contact 17, the unilaterally conductive valve 16 and the leads appurtenant thereto. This charging circuit operates to impress a potential across the capacitor 15 so that the potential appearing across the capacitor will present a high negative potential to the grid or control element of the valve 12. The potential of the capacitor 15 now causes the valve 12 to become nonconductive at the end of the positive half of the alternating current cycle supplied from the source 10. Let us assume that the potential appearing across the capacitor 15 is a certain value, for example, 25 volts, and that the voltage of the positive unidirectional current impulses supplied by the periodic unidirectional impulse generating circuit including the rectifier valves 19 and the secondary winding of the transformer 18 is but a fraction of the voltage appearing across the capacitor 15, as for example, one-fifth of the voltage or five volts. During one-half of every cycle of the alternating current transmitted through the transformer 18, the negative voltage appearing across the capacitor 15 will be reduced by an increment of voltage so that the voltage appearing across this capacitor will be represented by the curve C between the points X and Y. The increments of voltage applied by the periodic unidirectional impulse generating circuit reduce the negative charge across the capacitor 15 as indicated by the portion of the curve C marked Z. Thus, during the last cycle of the alternating current the increment Z supplies this power to the point whereon the curve C will be sufficient to reduce the voltage appearing across the capacitor 15 to a value where the valve 12 will become conductive. The valve 12 again passes a half cycle of current and charges the capacitor 15 by means of the charging circuit to such a value that the potential across the capacitor 15 is again negative. This cycle of operation will be repeated as long as the valve is energized. Thus, in this instance, as shown by the curve in Fig. 2, the periodicity of the voltage impulses appearing across the output terminals 11 will be one-fifth of the frequency of the alternating current appearing across the terminals 10. By adjusting the position of the contact 17 on the impedance device 14, the periodicity of the voltage impulses appearing across the output terminals 11 may be selectively determined so as to be any sub-multiple of the frequency of the alternating current appearing across the input terminals 10.

In Fig. 3 there is disclosed a modification of that portion of the circuit of Fig. 1 which is made when the electric valve 12 is of the high vacuum type. It will be noted that the connections from the cathode of the unilaterally conductive device 16 now includes the winding of a transformer 21 and instead of being connected to the adjustable point 17 of the impedance device 14, this cathode lead is now connected to the cathode lead of the electric valve 12'. The anode to cathode circuit of the electric valve 12' now includes the source 10 and the other winding of the transformer 21 and the point 17' of the impedance device 14' which now appears as a resistor having one terminal thereof connected to the cathode lead of the valve 12'. The output circuit 11 is now connected across the transformer 21 and the impedance device 14'. A bias battery 22 may be included in the grid to cathode circuit so as to give the proper control characteristics to the discharge device 12'. If a continuous control type of vacuum type tube were substituted in the circuit of Fig. 1 without modification, the potential of the capacitor 15 would be built up so as to reduce the anode current flowing and thereby shut off the current flowing before the capacitor 15 had been charged to a proper potential. In order to overcome this difficulty, the arrangement disclosed in Fig. 3 is utilized so that a rise in anode current will have no effect upon the charge of the capacitor 15. As the anode current decays, however, the voltage across the winding of the transformer 21 will be in such direction as to charge the capacitor 15 to the required negative value.

While we have shown a particular arrangement operating from a pulsating or alternating current source, it will, of course, be understood by any one skilled in the art that we do not wish to be limited thereto since obviously, of course, the arrangement disclosed would operate from a source of periodic unidirectional impulses. It is, furthermore, obvious to those skilled in the art that the rectifying circuit comprising the rectifier valve 15, the secondary winding of the transformer 18 and the impedance device 20 may be any other type of circuit which produces periodic unidirectional impulses.

While we have shown a particular embodiment of our invention, it will, of course, be understood that we do not wish to be limited thereto, since many modifications may be made in the circuit arrangement shown and in the instrumentalities employed, and that we contemplate by the appended claims to cover any such modifications as fall within the true spirit and scope of our invention.

What we claim as new and desire to secure by Letters Patent of the United States is:—

1. The method of controlling an electric discharge device having a control electrode which consists in impressing upon said control electrode a potential sufficient to maintain said discharge device nonconductive, and subsequently changing said potential by periodic increments to a value such as to render said discharge device conductive.

2. Apparatus for generating periodic current impulses comprising an electric valve having a control element, means for impressing upon said control element a potential sufficient to render said valve nonconductive, means for changing by periodic increments the potential of said control element to a value sufficient to render said valve conductive, and means for reestablishing the original potential of said first mentioned means at predetermined intervals.

3. Apparatus for generating periodic current impulses comprising an electric valve having an anode, a cathode and a control element, means for impressing upon said control element a potential sufficient to render said valve nonconductive, means for changing by periodic increments the potential of said first mentioned means to a value sufficient to render said valve conductive, and means operative in response to the flow of anode current of said valve for periodically reestablishing the initial value of the potential of said first mentioned means.

4. Apparatus for generating periodic current impulses comprising an electric energy storage means, a unilaterally conductive circuit connected thereto for charging said storage means to a predetermined potential, a second circuit connected to said storage means, said second circuit having a high impedance and including a source of periodic unidirectional current impulses whereby the potential of said storage means is reduced by periodic increments to a predetermined value, an electric valve having a control element and a cathode associated with said energy storage means, said electric valve being arranged so that no current will flow therethrough until the potential of said storage means is reduced to said predetermined value, an anode circuit for said valve including a source of potential and means for developing a potential in response to current flow therein, and means for selectively supplying a portion of said latter potential to said unilaterally conductive charging circuit.

5. Apparatus for generating periodic current impulses comprising an electric energy storage means, a circuit connected thereto including a unilaterally conductive device and a source of potential for charging said storage means to a predetermined potential, a second circuit connected to said storage means including a high impedance device and a source of periodic unidirectional current impulses for reducing the potential charge of said storage means by periodic increments, an electric valve having a control element and a cathode connected to said energy storage means, said electric valve being nonconductive until the potential charge of said storage means is reduced to a predetermined value, an anode circuit for said electric valve including a source of potential and means for developing a potential in response to current flow in said circuit, and means for selectively including a portion of said latter potential as the source of potential in said first circuit for determining the value of the potential to which said energy storage means is charged.

6. Apparatus for generating periodic current impulses comprising an electric valve having a control electrode, an anode and a cathode, an anode circuit including a source of potential and means for developing a potential in response to current flow in said circuit, a capacitor associated with said cathode and said control element, a circuit including a unilaterally conductive device connected to said capacitor and said potential developing means for charging said capacitor to a potential of such sign and magnitude as to maintain said valve nonconductive, and a high impedance circuit including a source of periodic unidirectional impulses, said circuit being connected to said capacitor for reducing the potential charge thereof by periodic increments so as to render said valve conductive after a predetermined time.

7. Apparatus for generating periodic current impulses comprising an electric valve having a control electrode, an anode and a cathode, an anode circuit including a source of potential and an impedance device, a capacitor associated with said cathode and said control element, a circuit including a unilaterally conductive device connected between said control element and a point on said impedance device, a high impedance circuit including a source of periodic unidirectional impulses, said circuit being connected across said capacitor, and an output circuit connected across said impedance device.

8. Apparatus for generating periodic current impulses comprising an electric valve of the discontinuous control type having an anode, a cathode and a control element, an anode circuit including an impedance device, a capacitor associated with said cathode and said control element, a capacitor charging circuit connected between said control element and a point on said impedance device, said charging circuit including a unilaterally conductive device, a periodic unidirectional impulse generating circuit connected to said capacitor, said latter circuit including a transformer and a rectifier element, a source of pulsating current connected to energize said transformer and said valve anode circuit, and an output circuit connected to said impedance device.

9. Apparatus for generating periodic current impulses comprising an electric valve of the discontinuous control type having an anode, a cathode and a control element, an anode circuit including an impedance device for generating a voltage in response to the flow of anode current, a capacitor connected in the grid circuit of said valve, a circuit connected to said capacitor and to an adjustable contact on said impedance device, said circuit including a unilaterally conductive device for permitting said capacitor to be charged to a potential dependent upon the position of said adjustable contact, a rectifying circuit having its output connected to said capacitor for reducing by periodic increments the charge on said capacitor, a source of alternating current for energizing said rectifier circuit and said valve, and an output circuit connected to said impedance device.

CRAMER W. LA PIERRE.
MILTON S. MEAD.
FRANCIS B. MENGER.